J. J. WOOD.
DYNAMO ELECTRIC MACHINE.
APPLICATION FILED JULY 1, 1912.
1,132,992.
Patented Mar. 23, 1915.
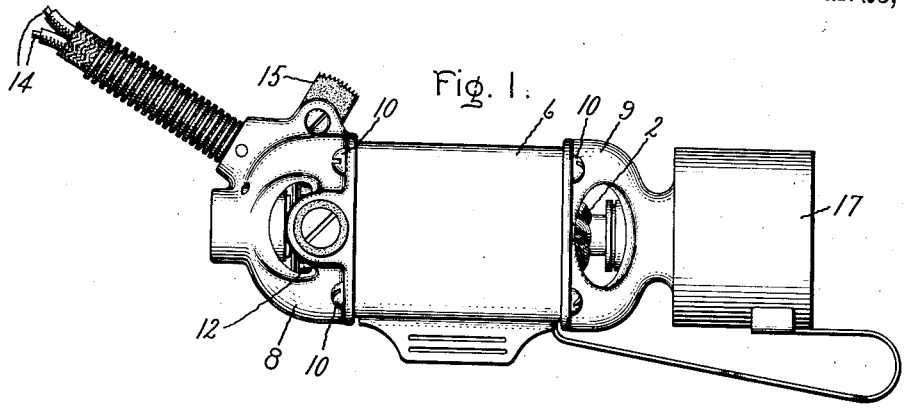
Fig. 1.
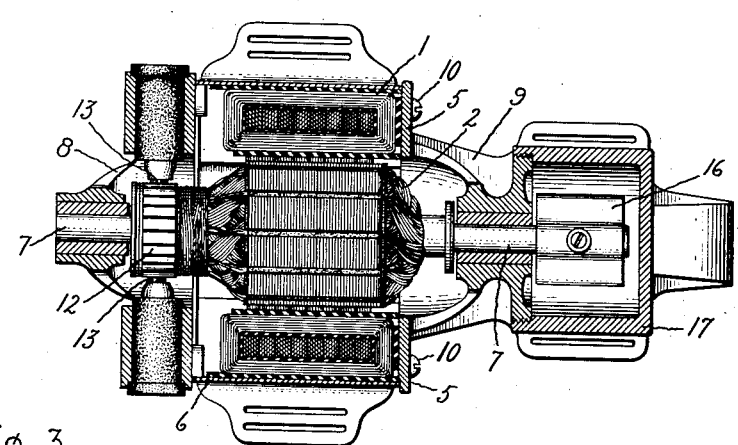
Fig. 2.
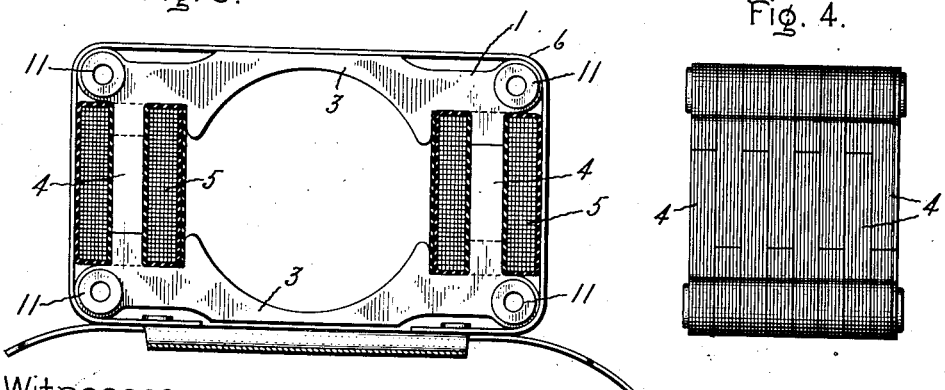
Fig. 3.
Fig. 4.
Witnesses:
George W. Tilden
J. Ellis Glen
Inventor:
James J. Wood,
by Allen G. Davis
His Attorney.

UNITED STATES PATENT OFFICE.

JAMES J. WOOD, OF FORT WAYNE, INDIANA, ASSIGNOR TO GENERAL ELECTRIC COMPANY, A CORPORATION OF NEW YORK.

DYNAMO-ELECTRIC MACHINE.

1,132,992.  Specification of Letters Patent.  Patented Mar. 23, 1915.

Application filed July 1, 1912. Serial No. 706,853.

*To all whom it may concern:*

Be it known that I, JAMES J. WOOD, a citizen of the United States, residing at Fort Wayne, county of Allen, State of Indiana, have invented certain new and useful Improvements in Dynamo-Electric Machines, of which the following is a specification.

My invention relates to dynamo electric machines and is particularly applicable to small machines such as those of fractional horsepower.

My invention has for its object a novel construction of field magnet which is cheap and permits the use of form-wound field coils. Form-wound field coils are neat in appearance and a given number of turns can be wound in a much smaller space than is the case with hand-wound coils, consequently the dynamo electric machine may be made smaller by the use of form-wound coils.

The various features of novelty which characterize my invention are pointed out with particularity in the claims annexed to and forming a part of this specification.

For a better understanding of my invention, reference may be had to the following description taken in connection with the accompanying drawing in which—

Figure 1 is a side elevation of a dynamo electric machine embodying my invention; Fig. 2 is a longitudinal section of the machine of Fig. 1; Fig. 3 is a front elevation of the field magnet of the machine of Fig. 1 with the field coils in section, and Fig. 4 is an end elevation of the field magnet of Fig. 3 with the field coils removed.

In the drawing, I have illustrated my invention in a dynamo electric machine which rotates an eccentrically mounted weight so that the whole machine vibrates and may therefore be used as a hand massage vibrator. This, however, forms no part of my invention.

The dynamo electric machine comprises a field magnet structure 1 and an armature 2. The field magnet 1 consists of only two parts, each of which has a central pole piece 3, and tongues 4 and grooves at both ends thereof. The two parts of the field magnet fit together to form a complete magnetic circuit, the tongues 4 on one part fitting into the grooves on the other part. Field coils 5 surround the tongues 4. I preferably construct each of the parts of the field magnet structure out of laminations, each of which has a central pole-shaped portion and a long projection at one end and a short projection at the other end, the central pole shaped portions and the projections being integral. These members are assembled in bundles, which are reversely placed so as to form the tongues and grooves described above. The field coils 5 are preferably form-wound, and in assembling the field magnet structure the projections enter the field coils, the projections which form the tongues 4 of one part fitting into the grooves of the other part so as to form a complete magnetic circuit. A continuous casing 6 fits about the outer periphery of the field magnet structure to hold the parts thereof together.

The armature 2 is mounted on a shaft 7 which is journaled in end members 8, 9. Preferably the members forming each part of the field magnet structure are fastened together by rivets and the end members 8 and 9 are fastened to the field magnet structure by means of bolts 10 which are screwed into the rivets 11. These rivets hold the members, which form the parts of the field magnet structure, together.

I have shown the armature 2 provided with a commutator 12 on which brushes 13 bear. Leads 14 connect the dynamo electric machine with a source of current, which may be either direct or alternating current. A switch 15 is provided in the end member 8 so that the current may be easily cut off from the machine. Mounted on one end of the armature shaft is the eccentrically mounted weight 16, which is covered by a cap 17 screwed on the end of the end member 9.

I desire it to be understood that my invention is not limited to the particular construction shown and described and I aim in the appended claims to cover all modifications which do not depart from the spirit and scope of my invention.

What I claim as new and desire to secure by Letters Patent of the United States, is,—

1. In a dynamo electric machine, a field magnet structure consisting of only two parts, each part consisting of a central pole piece and tongues and grooves at the ends, said central pole pieces and said tongues being integral, said parts fitting together to form a complete magnetic circuit, the tongues of one part fitting into the grooves of the other part, field coils surrounding said tongues, and a continuous casing fitting about the outer periphery of said field magnet structure to hold the parts thereof together.

2. In a dynamo electric machine, a field magnet structure consisting of only two parts, each part consisting of members having a central pole-shaped portion and long and short projections at the ends, said central pole shaped portions and said projections being integral, said members being reversely placed so as to form tongues and grooves, said parts fitting together to form a complete magnetic circuit, the tongues of one part fitting into the grooves of the other part, field coils surrounding said projections, and a continuous casing fitting about the outer periphery of said field magnet structure to hold the parts thereof together.

3. In a dynamo electric machine, a field magnet structure consisting of only two parts, each part consisting of laminations and rivets fastening said laminations forming each part together, said parts fitting together to form a complete magnetic circuit, field coils for said magnetic structure, a continuous casing fitting about the outer periphery of said field magnet structure to hold the parts thereof together, end members, and bolts screwed into said rivets for fastening said end members to said field magnet structure.

In witness whereof, I have hereunto set my hand this 27th day of June, 1912.

JAMES J. WOOD.

Witnesses:
A. L. HADLEY,
A. F. WELCH.